United States Patent [19]

Langhans et al.

[11] Patent Number: 5,497,051

[45] Date of Patent: Mar. 5, 1996

[54] CURRENT SUPPLY MEANS FOR A LASER FLASH LAMP

[75] Inventors: Lutz Langhans; Wolfgang Seifert; Olaf Mann, all of Starnberg, Germany

[73] Assignee: Carl Baasel Lasertechnik GmbH, Starnberg, Germany

[21] Appl. No.: 227,872

[22] Filed: Apr. 15, 1994

[30] Foreign Application Priority Data

Apr. 22, 1993 [DE] Germany ............................. 43 13 231.6

[51] Int. Cl.$^6$ .................................................. H05B 37/00
[52] U.S. Cl. .................. 315/200 A; 315/136; 315/209 R
[58] Field of Search ................................. 315/200 A, 129, 315/130, 136, 209 R

[56] References Cited

U.S. PATENT DOCUMENTS

| | | | |
|---|---|---|---|
| 3,869,641 | 3/1975 | Goldberg | 315/130 X |
| 4,140,932 | 2/1979 | Wohlert | 315/130 X |
| 4,453,140 | 6/1984 | Gindrup | 315/200 A X |
| 5,311,100 | 5/1994 | Brain | 315/129 |
| 5,321,591 | 6/1994 | Cimock et al. | 315/200 A X |

FOREIGN PATENT DOCUMENTS

A5595  11/1979  European Pat. Off. .

OTHER PUBLICATIONS

"Flashlamp Circuit Generates Stable Quasi–CW Pulses," *Laser Focus World*, vol. 18, No. 10 (Oct. 1982).
V. Lupei et al., "An Automatically Controlled Nd:YAG Laser with Variable Pulse Width," *Optics and Laser Technology*, vol. 23, No. 3 (Jun. 1993).

*Primary Examiner*—Robert J. Pascal
*Assistant Examiner*—Reginald A. Ratliff
*Attorney, Agent, or Firm*—Fisher & Associates

[57] ABSTRACT

Current supply means for a laser flash lamp contain a fast switch and control means which modulate the amplitude of each individual pulse with a presettable modulating frequency and depth of modulation. This permits higher peak envelope powers to be obtained at an unchanged mean power of the individual pulses so that the necessary threshold values can be better exceeded during materials processing. The amplitude modulation of the individual pulses also prevents undesirable shielding plasma from forming above the processing place.

18 Claims, 2 Drawing Sheets

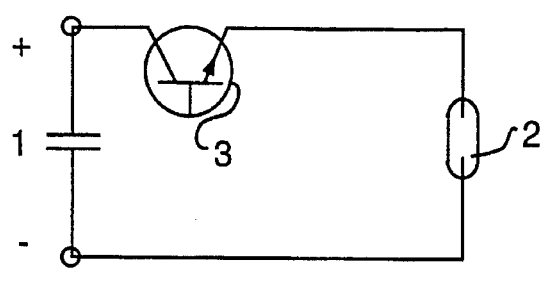
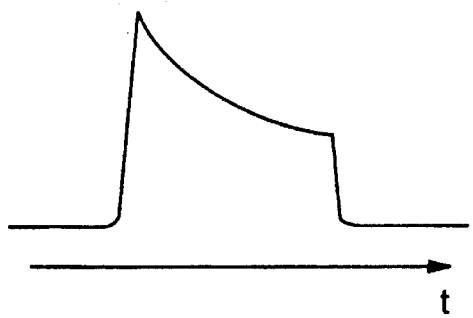
FIG. 1A
*(PRIOR ART)*
FIG. 1D
*(PRIOR ART)*
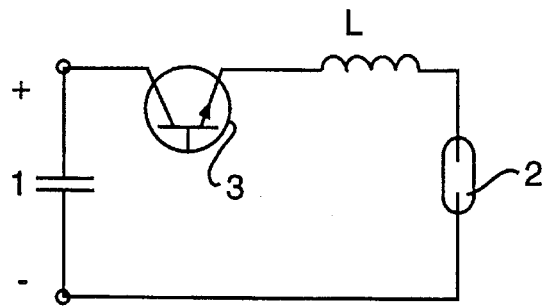
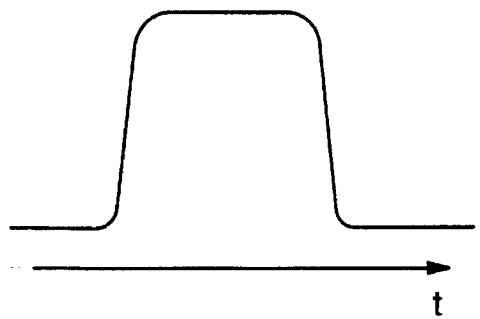
FIG. 1B
*(PRIOR ART)*
FIG. 1E
*(PRIOR ART)*
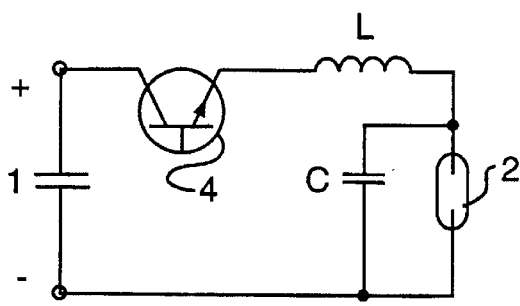
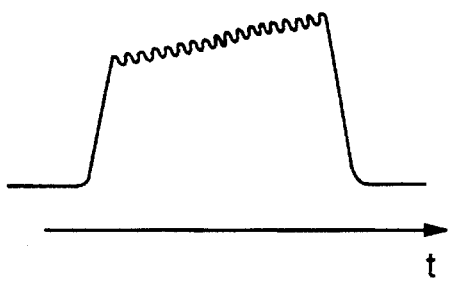
FIG. 1C
*(PRIOR ART)*
FIG. 1F
*(PRIOR ART)*

CURRENT SUPPLY MEANS FOR A LASER FLASH LAMP

BACKGROUND OF THE INVENTION

1. Field of the Invention

The present invention relates to current supply means for a laser flash lamp which is connected to a constant voltage source with a charging capacitor and provides current pulses of a certain duration and amplitude.

2. Description of the Prior Art

The intensity of the flashes produced by the laser flash lamp of a laser device depends on the power of the pulses produced for operating the laser flash lamp. The energy of the pulses is determined by their power (amplitude) and duration.

Pulses of a certain shape are necessary or particularly favorable for certain applications.

Using the pulse shaper circuit one can not only vary the pulse duration but also vary the characteristic of the amplitude of the individual pulses. Known current supply means have in common that the pulses finally provided to the laser flash lamp each have a smooth amplitude characteristic, this characteristic being ramp-shaped for example.

In the prior art three pulse shapes are known:

a) discharging capacitor 1 via switch 3 results in a smooth, sloping pulse (FIGS. 1a and 1d)

b) discharging capacitor 1 via switch 3 and a filter (inductive resistor L) results in a smooth, approximately rectangular pulse (FIGS. 1b and 1e)

c) discharging capacitor 1 via high-frequency switch 4 with pulse width modulation and subsequent low-pass filter L, C results in a smooth pulse whose shape can be adjusted, e.g. ascending (FIGS. 1c and 1f). Such an assembly is described in EP-B1-5595.

In many cases of application the intensity of the flashes emitted by the laser flash lamp plays a considerable part, and the amplitudes of the pulses fed to the laser flash lamp must thus meet corresponding requirements.

For welding, cutting and drilling metal, for example, the power in the individual pulses must exceed a certain threshold value so that the material to be welded is actually melted in the required way. These threshold values are dependent on the material, among other things. This can cause difficulties since the threshold value must be exceeded by the instantaneous pulse power, on the one hand, while a relatively low mean power of the pulse might be required, on the other hand, because the melting of the material necessary for the cutting or welding process is to be limited to a narrow area.

SUMMARY OF THE INVENTION

The invention is based on the problem of providing current supply means for a laser flash lamp of the type stated at the outset for improving the possibilities of applying the laser device.

This problem is solved according to the invention by modulating means for modulating the amplitude of the individual pulses.

Within each individual pulse its amplitude is modulated e.g. in such a way that the amplitude value changes several times between a maximum value and a—relative—minimum value. The number of these changes in amplitude, i.e. the so-called modulating frequency, and the extent of the variations in amplitude within a pulse, i.e. the so-called depth of modulation, are preferably adjustable by separate adjusting means.

While one hitherto endeavored to make the amplitude characteristic within each individual pulse as smooth as possible (in EP-B1-5595, for example, a pulse train modulated in pulse width is processed with a low-pass filter into an amplitude characteristic which is continuously smooth but possibly varies slowly in time), the present invention uses a periodically fluctuating pulse amplitude within the particular pulse duration selectively to obtain certain effects.

One of these effects is that relatively high peak powers are obtained at the same mean power of the pulse repeatedly within each pulse. The relatively high peak powers permit the abovementioned threshold values to be exceeded more reliably than with a smooth amplitude characteristic of the pulse at the same mean power.

If the laser device is used for example for welding, cutting and drilling metallic materials which are characterized by a certain threshold power of the laser pulses, while the thermally influenced zone is to be limited to a narrow local area of the workpiece, one can adjust the pulse shaper circuit so as to set a relatively low mean pulse power for driving the laser flash lamp while simultaneously using pronounced amplitude modulation of the individual pulses so that the threshold value given by the material to be cut or welded is exceeded reliably (and repeatedly).

A further effect of the inventive measure is to prevent a shielding plasma from coming about during laser machining. When welding metallic workpieces one observes plasma arising above the weld. This plasma can hinder the laser light from passing freely to the weld. This shielding effect of the plasma is of course undesirable. The inventive measure can reduce its formation to such an extent that a shielding effect no longer occurs.

BRIEF DESCRIPTION OF THE DRAWINGS

The invention will further described in conjunction with the accompanying drawings, in which:

FIGS. 1a through 1f illustrate prior art circuits and associated pulse shapes,

DETAILED DESCRIPTION OF THE PREFERRED EMBODIMENT

Figure 2:
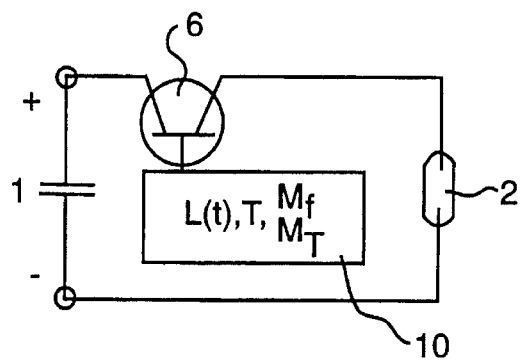
FIG. 2 shows a block diagram of current supply means for a laser flash lamp.

According to FIG. 2 laser flash lamp 2 is connected via fast switch 6 to constant voltage source with charging capacitor 1.

Fast switch 6, e.g. a transistor, can release and interrupt the lamp current with a high recurrence frequency of some ten kilohertz. By suitably selecting the switching frequency and the pulse width one can adjust not only total pulse duration T and mean pulse height curve L(t) but also modulating frequency Mf and depth of modulation $M_T$ by control means 10 (FIG. 2).

Figure 3:
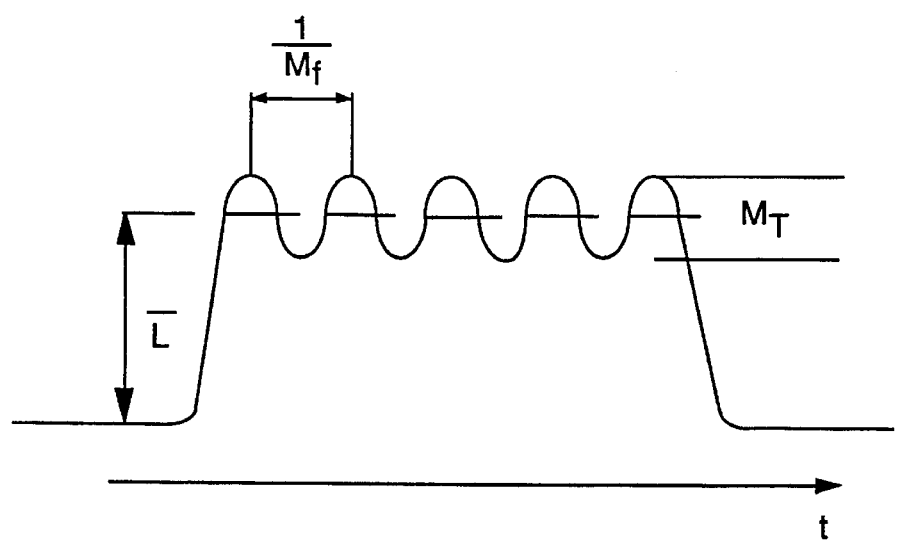
FIG. 3 shows an enlarged view of a pulse formed in the inventive way for driving a laser flash lamp.

As shown in FIG. 3, the modulation does not alter mean power L of the individual pulse. However the amplitude of the pulse changes continuously between two values which are given by depth of modulation $M_T$.

Figure 4:
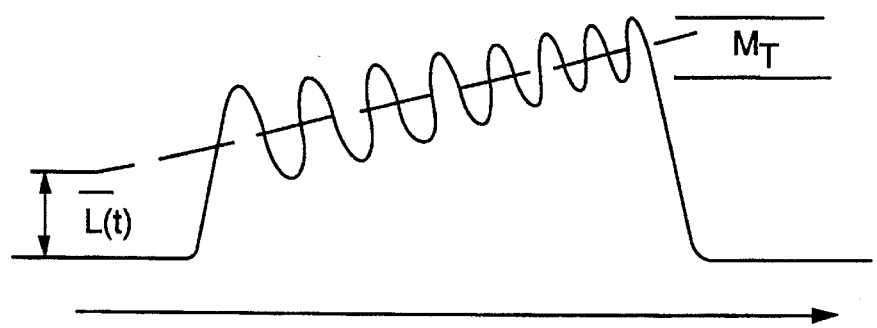
FIG. 4 shows a pulse shape modified over FIG. 3.

FIG. 4 shows another example with an ascending pulse curve, ascending modulating frequency and descending depth of modulation. This pulse shape has proven particularly suitable for spot welding. Fast switch 6 can also be a GTO (gate turn-off) thyristor, an IGBT or a thyristor with reset thyristor.

Control means (10) preferably contain a microprocessor.

We claim:

1. A current supply means for a laser flash lamp which is connected to a constant voltage source with a charging capacitor and provides a train of current pulses, each pulse having a certain different duration and amplitude, characterized by a fast switch and control means for adjusting depth of modulation ($M_T$) and/or a modulating frequency ($M_f$) in addition to mean pulse height and pulse duration of each pulse independently of said train of pulses.

2. The current supply means recited in claim 1 wherein said charging capacitor is electrically parallel to said constant voltage source.

3. The current supply means recited in claim 1 wherein said fast switch is in series with said charging capacitor.

4. The current supply means recited in claim 1 wherein said fast switch is in series with said constant voltage source.

5. The current supply means recited in claim 1 wherein said control means is a microprocessor.

6. A current supply means for providing a train of current pulses, each pulse having a certain different duration and amplitude to a load, said current supply means comprising:

a constant voltage source;

a charging capacitor;

a fast switch disposed between said voltage source and said laser flash lamp; and control means for adjusting depth of modulation ($M_T$) and/or a modulating frequency ($M_f$) in addition to mean pulse height and pulse duration of each pulse independently of said train of pulses by actuating said fast switch.

7. The current supply means recited in claim 6 wherein said charging capacitor is electrically parallel to said constant voltage source.

8. The current supply means recited in claim 6 wherein said fast switch is in series with said charging capacitor.

9. The current supply means recited in claim 6 wherein said fast switch is in series with said constant voltage source.

10. The current supply means recited in claim 6 wherein said control means is a microprocessor.

11. A current supply means for a supply means for a laser flash lamp which is connected to a constant voltage source with a charging capacitor and provides current pulses of a certain duration and amplitude, characterized by a fast switch and control means for adjusting depth of modulation ($M_T$) and/or a modulating frequency ($M_f$) in addition to mean pulse height and pulse duration;

wherein said charging capacitor is electrically parallel to said constant voltage source.

12. The current supply means recited in claim 11 whereto said fast switch is in series with said charging capacitor.

13. The current supply means recited in claim 11 wherein said fast switch is in series with said constant voltage source.

14. The current supply means recited in claim 11 wherein said control means is a microprocessor.

15. A current supply means for providing current pulses of a certain duration and amplitude to a load, said current supply means comprising:

a constant voltage source;

a charging capacitor;

a fast switch disposed between said voltage source said laser flash lamp; and control means for adjusting depth of modulation ($M_T$) and/or a modulating frequency ($M_f$) in addition to mean pulse height and pulse duration of said current pulses by actuating said fast switch;

wherein said charging capacitor is electrically parallel to said constant voltage source.

16. The current supply means recited claim 15 wherein said fast switch is in series with said charging capacitor.

17. The current supply means recited in claim 15 wherein said fast switch is in series with said constant voltage source.

18. The current supply means recited in claim 15 wherein said control means is a microprocessor.

\* \* \* \* \*